Feb. 9, 1926.

R. D. MERSHON 1,572,404

PROTECTING CONDENSER PARTS AGAINST CORROSION

Filed Sept. 27, 1921      2 Sheets-Sheet 1

INVENTOR.
R. D. Mershon,
BY
Kerr, Page, Cooper & Hayward
ATTORNEY

Feb. 9, 1926.  1,572,404
R. D. MERSHON
PROTECTING CONDENSER PARTS AGAINST CORROSION
Filed Sept. 27, 1921   2 Sheets-Sheet 2
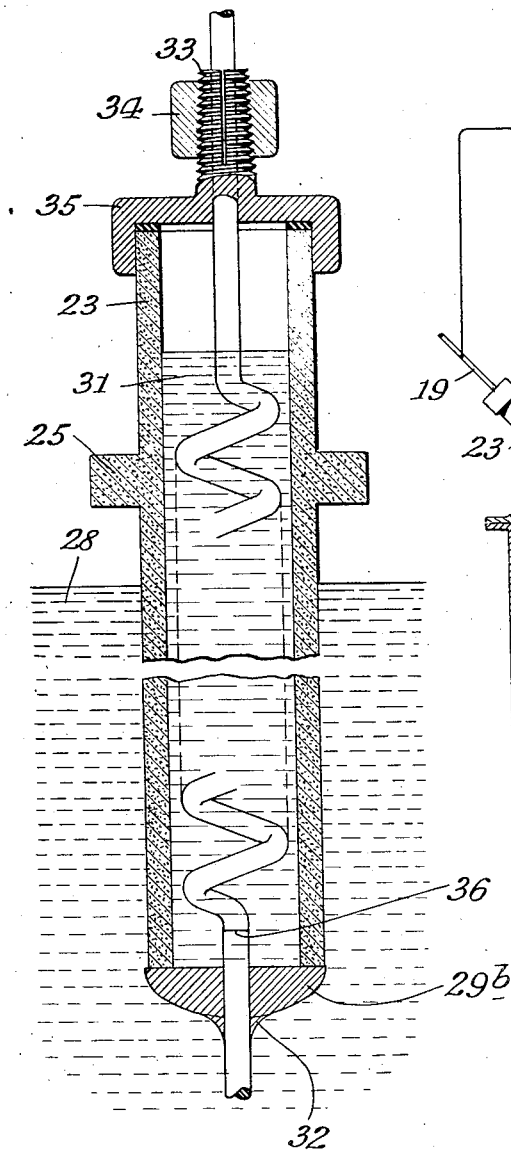
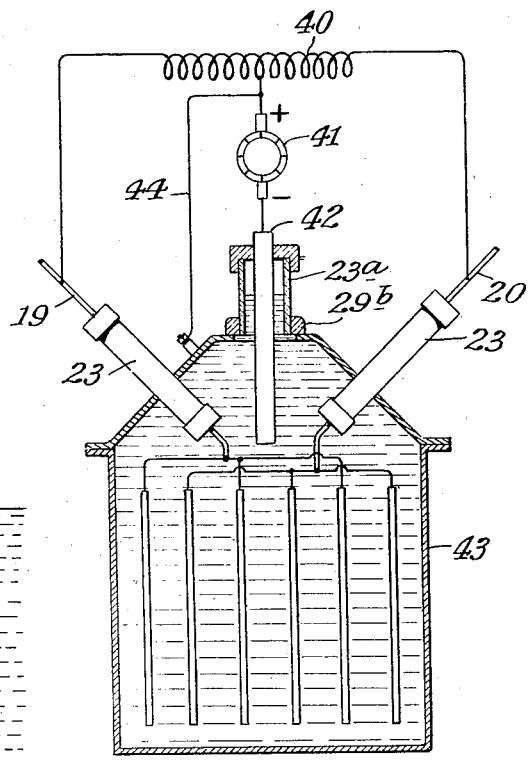
INVENTOR
R.D. Mershon,
BY
Kerr, Page, Cooper & Hayward
ATTORNEY Patented Feb. 9, 1926.

1,572,404

UNITED STATES PATENT OFFICE.

RALPH D. MERSHON, OF NEW YORK, N. Y.

PROTECTING CONDENSER PARTS AGAINST CORROSION.

Application filed September 27, 1921. Serial No. 503,689.

*To all whom it may concern:*

Be it known that I, RALPH D. MERSHON, a citizen of the United States of America, residing at New York, in the county and State of New York, have invented certain new and useful Improvements in Protecting Condenser Parts Against Corrosion, of which the following is a full, clear, and exact description.

In the operation of electrolytic condensers and similar apparatus consisting essentially of a plurality of electrodes composed of aluminum or other suitable metal immersed in an electrolyte (for example, an aqueous solution of borax and boric acid), the active parts, that is, those upon which current is impressed, are always or nearly always subject to corrosion at the points where they extend out of the electrolyte, at or near the surface of the latter. It is accordingly my usual practice to entirely submerge the electrodes and busbars in the electrolyte, and carry the leads out of the latter; thus confining the corrosion which takes place at the surface of the electrolyte to the leads, which are relatively cheap and are more easily replaced or renewed than the other parts mentioned. My present invention is designed to obviate this trouble, and accomplishes the desired result in a simple and novel manner, by a construction in which the lead or other part to be protected may project out of the electrolyte and yet not be in contact therewith at its surface. To this and other ends the invention consists in the novel features hereinafter described.

In the accompanying drawing,

Fig. 6 is a section illustrating another modification.

Fig. 7 is a section illustrating a convenient construction for use when the container or tank is "excited" to prevent corrosion by electrochemical or electrolytic attack.

Figure 3:
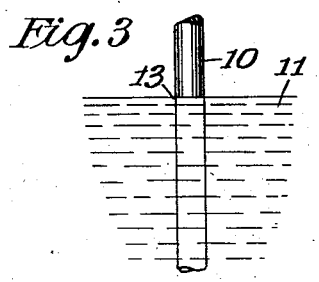
Fig. 3 is a detail view showing a lead or other active part of a condenser, extending out of the electrolyte and in contact with the electrolyte at the surface thereof.

Referring first to Fig. 3, a lead or other "active" part of an electrolytic condenser is indicated at 10, extending out of an electrolyte 11. Experience has shown that when the condenser is in operation the metal corrodes at or above the point 13, at the surface of the eyectrolyte, and is ultimately eaten through. It is this kind of corrosion that my present invention is especially designed to eliminate.

Figure 1:
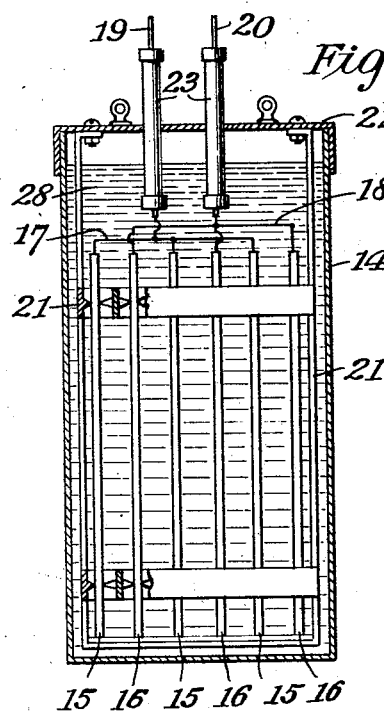
Fig. 1 shows in cross section an electrolytic condenser in which my invention is embodied to protect the leads extending out of the tank for connection with the external circuit.

Referring to Fig. 1, 14 designates the tank of an electrolytic condenser, containing the electrolyte 11 in which is submerged a suitable number of filmed metal electrodes, or "anodes" as they may be conveniently termed, represented at 15 and 16, anodes 15 being connected to a busbar 17 and the others to the busbar 18, which busbars are themselves connected to the leads 19, 20, respectively. In practice the anodes may be mounted in an insulating cage or frame 21, suspended from the tank cover 22 so that by lifting the cover the anode assembly will be lifted out of the electrolyte for convenient inspection and repair.

Figure 2:
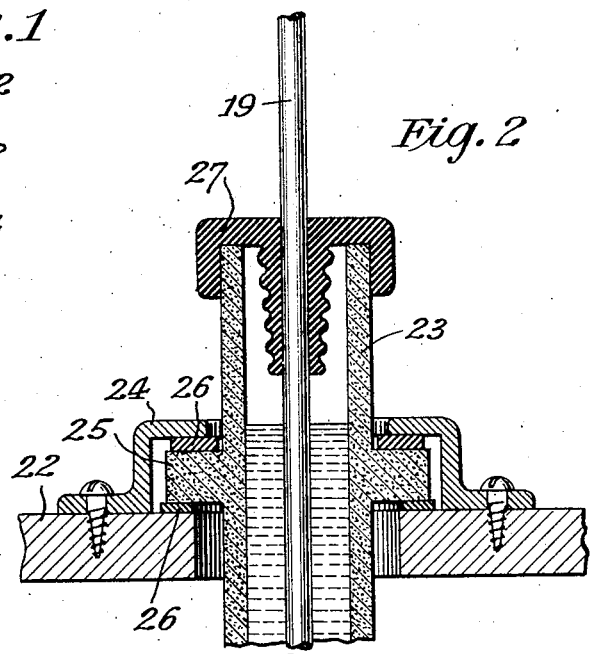
Fig. 2 is a detail sectional view of one of the lead-insulators.

The leads 19, 20, extend upwardly from the busbars 17, 18, through insulating tubes 23, preferably of porcelain, though they may be of any suitable non-conducting material which will not injuriously contaminate the electrolyte. The tubes or bushings can be mounted or supported in any convenient manner, as by means of a flanged collar 24, Fig. 2, fastened to the tank cover 22 over the circumferential rib 25 on the tube. If tight joints are desired, yielding gaskets, as 26, may be employed above and below the rib. At the top the tube may be closed by a dust-cap 27, preferably of soft rubber and of proper size to grasp the tube and lead firmly and make tight joints therewith.

At the bottom the tube extends into the electrolyte, indicated at 28, and is closed hermetically by a cap or other form of closure 29, composed of the same metal as the lead 19, which is usually aluminum. The cap may be shrunk or driven on, but preferably it is cast on, as I have found that if aluminum is cast around the porcelain tube, especially if the tube is glazed, the metal joins the porcelain or glaze and adheres so closely thereto that it can be removed only by scraping or by chemically dissolving it off, that is, of course, without breaking the tube. Porcelain tubes, especially glazed porcelain tubes, are preferred, but tubes of other materials may be used, as for example glass. In the bottom of the cap is an opening through which the lead is inserted, after which the lead and the cap are welded together, as indicated at 30, the weld being made in any suitable way, as for example by the method described in my prior patent No. 1,269,726, issued June 18, 1918. Or, if not welded, the lead and cap should have such close metallic contact with each other as to be integral in effect and thus exclude electrolyte from the joint. The lead is thus sealed hermetically to the cap and the two are in effect integral. The joints thus obtained at the submerged lower end of the tube or bushing exclude the electrolyte from the tube, with the result that nowhere is the lead or cap in contact with the electrolyte at the surface of the latter. At all points where the aluminum parts are in contact with the electrolyte they are submerged therein, and hence are not subject to the corrosive attack referred to above. Nevertheless the lead does project out of the electrolyte and outside of the insulating tube or bushing for convenient connection with the external circuit.

In affixing the closure to the inner end of the tube (which may, of course, extend into the tank through the side or even through the bottom thereof), care should be taken to have the tube clean, so as to insure an adequate contact or bond between the two, for if the joint is not good, the electrolyte will leak in between the cap and the tube and the cap or the lead or both will eventually suffer. As a safeguard against leaks the tube may contain oil, as indicated at 31, up to a height such as will give the oil a head sufficient to overcome the head of the heavier electrolyte, which, it will be remembered, contains one or more substances in solution and hence is heavier than pure water. Then if there is a leak, the oil will seep out into the electrolyte and prevent ingress of the latter. Naturally, the oil should be neutral, or should not be capable of attacking the parts with which it is in contact or of injuriously contaminating the electrolyte. Other harmless liquids might be used. Oil is preferred, however, as it is more penetrating. Additional oil may be supplied from time to time by removing the closure 27, to compensate for leakage at the bottom if there is any appreciable loss at that point.

Figure 4:
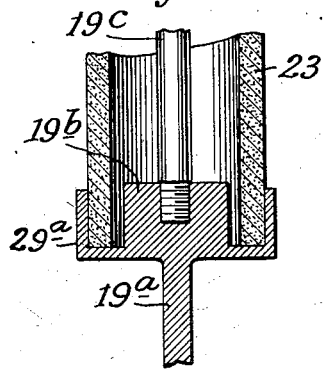
Figs. 4 and 5 are detail sections illustrating modifications of the construction shown in Fig. 2.
Figure 5:
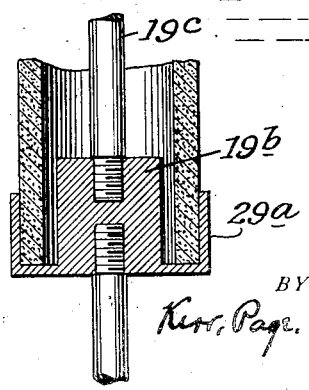

Outside of the tube 23 the lead and the cap or closure should be in close metallic contact, the two being preferably integral. The integral connection may be made by welding, as in Fig. 2, or the parts may be cast together, as in Fig. 4. Here the cap 29ª is cast with a depending stem 19ª, which serves as the inner or immersed portion of the lead, and with a lug or boss 19ᵇ, preferably inside the tube, to which the external portion 19ᶜ of the lead may be welded or screwed. Or the inner lead may be screwed into the underside of the cap, as in Fig. 5, in which case care should be taken to obtain a good fit so that the two parts are in effect integral. In the appended claims the word integral is used in a generic sense to include a construction in which the parts are actually integral, as in Fig. 4; or welded, as in Fig. 2; or in close metallic contact, as in Fig. 5; or connected in any equivalent manner.

It will be observed that the metallic surface of the part composed of lead 19 and closure 29 is both in contact and out of contact with the electrolyte, but that the line or point where the surface in contact ends and the surface out of contact begins, namely, the inner edge $e$ of the closure, is itself below the surface of the electrolyte. So also in Figs. 4, 5 and 6. This submergence of the boundary line betweeen surfaces in contact and out of contact with the electrolyte is one of the most important features of the invention, and characterizes the several embodiments illustrated herein.

The portion of the lead inside of the insulating tube need not be of filming metal, but may be of copper, brass, or other metal. Thus the rods 19ᶜ, Figs. 4 and 5, may be of copper, and the upper portion of lead 19, Fig. 2, may also be of copper, welded to the lower portion, say at the line 19ᵈ.

The coefficient of expansion and contraction of aluminum is high in comparison with that of porcelain, glass, or other insulating material, and hence the contraction of the aluminum cap on cooling may break the tube. To prevent this result the cap walls should be thin enough to stretch sufficiently to overcome the shrinkage on cooling. Then if the stretching does not exceed the elastic limit of the metal, subsequent expansion will not open the joint between the cap and the tube.

In the construction shown in Fig. 6 the closure 29ᵇ at the inner end of the insulating tube is in the form of a disk or button, and the two are ground together to give as tight a fit as possible. The closure and the lead are welded together, as at 32, or the connection between the closure and the lower portion of the lead may be made by the methods described in connection with Figs. 4 and 5. Above the closure the lead may be coiled to form a contractile spring, as indicated, so as to draw the closure up firmly against the tube. The spring may be held under tension by a tapered sleeve 33 and nut 34 on the outer cap 35. In order to give the spring greater resiliency than aluminum ordinarily has, the lead may be composed of aluminum up to a point above the closure, say to the point indicated at 36, and above this point it may be of more resilient metal, as brass, preferably welded to the aluminum, as this gives the best electrical joint. In the construction illustrated in Fig. 6 it is more difficult to get a permanently tight joint between the tube and the inner closure, but the oil in the tube (indicated at 31) will take care of any small leaks that may occur, as explained in connection with Fig. 2.

If the tank containing the electrolyte is of filming metal it may suffer corrosion by electrolytic action due to stray alternating currents, and in my co-pending application Ser. No. 410,314, filed September 14, 1920, I have described a method of preventing or largely diminishing such attack. In this method the tank is "excited", that is, there is impressed upon it a unidirectional voltage at least equal to, and preferably in excess of, the maximum alternating voltage to which it may be subjected. Excitation does not, however, always prevent corrosion at the surface of the electrolyte, as herein explained, and hence to prevent such attack on the metal tank or metal lining thereof I make use of my present invention, as for example in the manner illustrated in Fig. 7. Here the leads 19, 20, are connected to the terminals of a balance coil 40, to the middle point of which is connected the positive pole of a unidirectional source 41. The negative pole is connected to the electrolyte by means of a cathode 42 of non-filming material. The condenser is thus excited, and reversal of film stress on the anodes, busbars and leads is prevented. In order to "excite" the tank 43, it is also connected, as by a wire 44, to the positive pole of source 41. To prevent corrosion of the tank at the surface of the electrolyte the tube 23ª is provided, composed of glass, porcelain, or other suitable material, and serving also as a means of insulating the cathode from the tank. This tube extends into the tank and has cast on it an aluminum ring 29ᵇ which is welded to the tank. If now the tank is kept filled with electrolyte, at least to a level above the inwardly exposed surface of the ring 29ᵇ, preferably well into the tube 23ª, no part of the tank will be out of contact with the electrolyte at the surface of the latter. In other words, the boundary line between the surfaces of tank 43 and ring 29ᵇ in contact and out of contact with the electrolyte is below the surface of the latter.

By the term "surface of the electrolyte" and equivalent expressions as used in the foregoing description and in the appended claims, I mean the surface which bounds the electrolyte adjacent to or at its juncture with the gaseous medium (air, water vapor, or other gaseous or vaporous substance or substances) above the electrolyte.

It is to be understood that the invention is not limited to the specific construction herein illustrated or described but can be embodied in other forms without departure from its spirit.

I claim:

1. In an electrolytic apparatus of the kind described, the combination with a tank, an electrolyte therein, and filmed anodes immersed in the electrolyte and electrically connected in groups, of a porcelain tube extending through a wall of the tank into the electrolyte, a submerged closure composed of filming metal cast on the inner end of the tube to hermetically seal the same against the electrolyte, and a lead of filming metal, connected to one of the groups of anodes and extending through said submerged closure into the tube for connection with an external circuit, and integral with the said closure.

2. In an electrolytic apparatus of the kind described, the combination with a tank, an electrolyte therein, and filmed metal anodes immersed in the electrolyte and electrically connected in groups, of an insulating tube extending into the electrolyte, a submerged closure of filming metal on the submerged end of the tube and closely fitted thereto to exclude electrolyte, and a lead of filming metal extending from one of the anode groups through the submerged closure and having integral connection with the closure.

3. In an electrolytic apparatus of the kind described, the combination with a tank, an electrolyte therein, and filmed metal anodes immersed in the electrolyte and electrically connected in groups, of an insulating tube extending into the electrolyte, a submerged closure of filming metal on the submerged end of the tube and closely fitted thereto to exclude electrolyte, a lead of filming metal extending from one of the anode groups through the submerged closure into the tube and having integral connection with the closure, and a body of oil in the tube, adapted to seep out through any crevices that may exist between the closure and the tube.

4. The combination with an electrolytic apparatus comprising an electrolyte, and filmed metal anodes immersed therein and electrically connected in groups, of an insulating tube extending into the electrolyte and having an opening submerged therein, a closure of filming metal over said opening and closely fitted to the tube to exclude the electrolyte, and a lead of filming metal integral with the submerged closure and extending through the latter into electrical connection with one of the anode groups.

5. The combination with an electrolytic apparatus comprising an electrolyte, and filmed metal anodes immersed therein and electrically connected in groups, of an insulating tube extending into the electrolyte and having an opening submerged therein, a closure of filming metal over said opening and closely fitted to the tube to exclude the electrolyte, and a lead of filming metal integral with the submerged closure and extending through the latter into electrical connection with one of the anode groups, and a body of oil in said tube and adapted to seep out into the electrolyte through any crevices existing between the tube and said closure.

6. The combination with an electrolytic apparatus comprising an electrolyte, and filmed metal anodes immersed therein and electrically connected in groups, of a porcelain tube extending into the electrolyte and having an opening submerged therein, a closure of filming metal cast on said tube over the submerged opening therein to exclude the electrolyte, and a lead of filming metal integral with the submerged closure and extending through the latter into electrical connection with one of the anode groups.

7. The combination with an electrolytic apparatus comprising an electrolyte, and filmed metal anodes immersed therein and electrically connected in groups, of a porcelain tube extending into the electrolyte and having an opening submerged therein, a closure of filming metal cast on said tube over the submerged opening to exclude the electrolyte, a lead of filming metal integral with the submerged closure and extending through the latter into electrical connection with one of the anode groups, and a body of oil in said tube.

8. In an electrolytic apparatus, a tubular body of insulating material having applied to it a body of filming metal in hermetic contact therewith to exclude electrolyte from from the joint between the two.

9. In an electrolytic apparatus, a tubular body of insulating material having a vitreous surface, and having applied to such surface a body of filming metal in hermetic contact therewith to exclude electrolyte from the joint between the two.

In testimony whereof I hereto affix my signature.

RALPH D. MERSHON.